Jan. 23, 1962 R. McAULAY ETAL 3,018,346
FLOAT CONTROLLED SWITCH ASSEMBLIES
Filed Feb. 25, 1960 2 Sheets-Sheet 1

INVENTORS
ROBERT McAULAY
WILLIAM G. RICHARDSON

*Imirie & Smiley*
ATTORNEYS

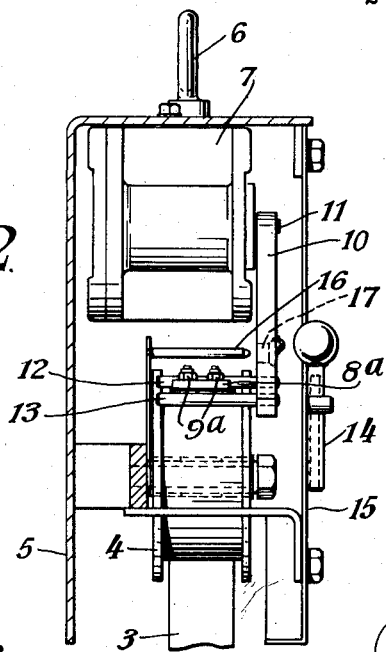
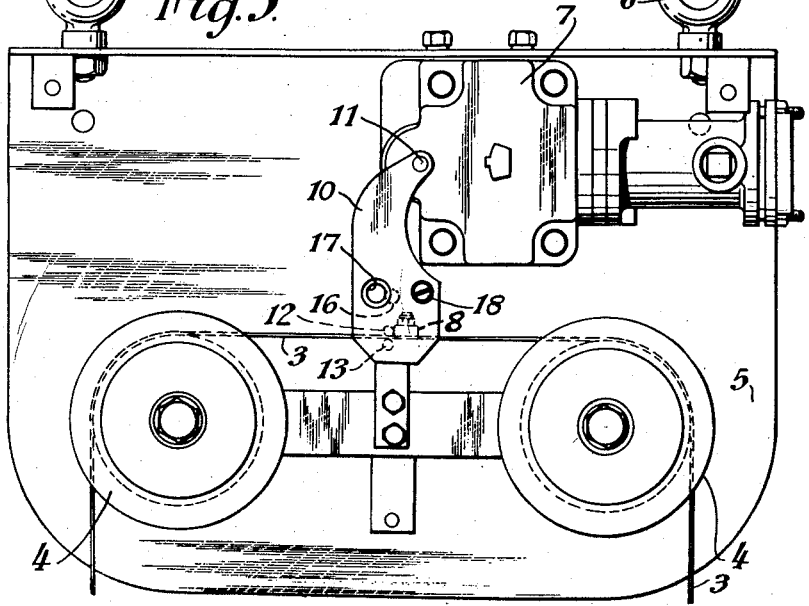

3,018,346
FLOAT CONTROLLED SWITCH ASSEMBLIES

Robert McAulay, Edgware, and William George Richardson, London, England, assignors to Megator Pumps and Compressors Limited, London, England
Filed Feb. 25, 1960, Ser. No. 10,988
Claims priority, application Great Britain Mar. 5, 1959
6 Claims. (Cl. 200—84)

This invention relates to float controlled switch assemblies of the kind including a flexible component hitherto in the form of a wire rope passing over pulleys and operating a switch by means of one or more stops on the rope, the rope carrying a float at one end and a counterweight at the other end.

As previously constructed such assemblies took up a considerable amount of room due to the fact that the switch operating stop embraced the wire rope and could not therefore pass around the pulleys, it being therefore impossible to mount the switch between the pulleys but at some lower point in the upward and downward travel of the rope. Furthermore, only a small part of the length of the rope was available for carrying the stop member.

The chief object of the invention is to evolve an improved construction which will take up considerably less room in operation, this being particularly desirable where the amount of vertical headroom is limited.

An assembly in accordance with the present invention utilises a flexible component in the form of a flat belt or tape passing over a pulley or pulleys and carrying at its ends a float and counter weight, the belt or tape carrying on its outer surfaces which does not engage the pulley or pulleys, a suitably positioned projecting stop or stops for actuating an electric switch as a result of linear movement of the belt or tape.

It will be appreciated therefore that the stop will not foul the pulley or pulleys over which the belt or tape passes and consequently at least one stop may be placed quite close to the end of the belt or tape carrying the counter-weight, thereby providing an extremely compact assembly.

Referring to the accompanying drawings:

FIGURE 2 is a vertical section, the front cover plate being in position; and

FIGURE 3 is a similar view to FIGURE 1, but showing the stop in its switch operating position.

Figure 1:
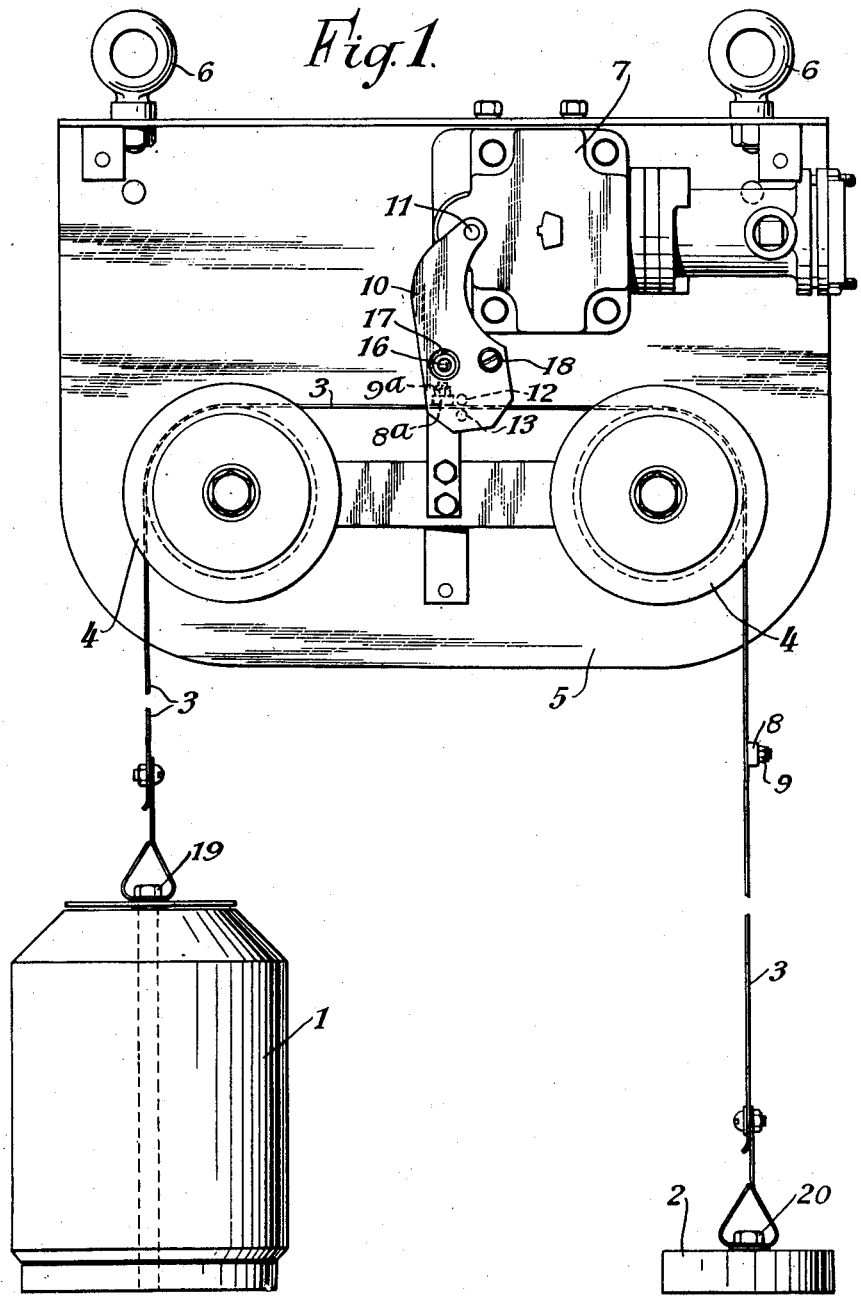
FIGURE 1 is a joint elevation of a float controlled switch assembly in accordance with the invention, the front cover plate having been removed.

The assembly illustrated includes a float 1 which is counter balanced by means of a weight 2, the float and weight being connected by a flat belt 3 which is preferably composed of nylon, the belt passing over two spaced flanged pulleys 4 supported upon a mounting plate 5, the latter carrying a pair of spaced eyebolts 6 by means of which the assembly can be slung or otherwise supported from for example a mine roof, the float projecting downwardly into the water.

The belt 3 carries a stop in the form of a transverse bar 8 which is attached to the belt at a suitable point by means of a pair of spaced securing screws or bolts 9. The screws have countersunk heads which form dimples in the belt, the bar being formed with correspondingly shaped recesses so that the inner surface of the belt is free from projections and consequently can pass uninterruptedly over the two pulleys. It will be appreciated that by employing countersunk headed screws in conjunction with countersunk holes in the bar, the dimpling of the belt will not weaken the belt to any serious extent. For the purpose of adjustment it is proposed to form the belt throughout the whole or a part of its length with spaced holes for selective engagement by the securing screws so that the bar can be placed in any suitable position.

A second bar 8a is provided for returning the switch to its original position, the bar being secured to the belt by securing screws 9a in a similar manner to bar 8, bars 8 and 8a being suitably spaced apart along the length of the belt. If it is desired to operate the switch in the reverse direction then the positions of the float and weight are reversed.

The switch 7 is fitted with an operating lever 10 pivotally mounted at 11, the switch contacts opening or closing as a result of the lever being moved by either stop over a dead-centre position.

The lever 10 carries two transverse pins 12 and 13, pin 12 being engaged by stop 8 or 8a according to the direction of movement of the belt whilst pin 13 serves to keep the belt in position so that the stops cannot miss pin 12 even if the belt flaps about due to rapid movement of the liquid.

It will be appreciated therefore that as the float 1 descends due to sinking of the liquid level, stop 8 will come into contact with pin 12 to displace the operating lever 10 of the switch from the position shown in FIGURE 1 to the position shown in FIGURE 3, thus completing or breaking an electrical circuit.

The switch will remain in the position into which it has been moved until the float again rises and causes stop 8a to engage the pin 12 to move the switch operating lever in the opposite direction.

Instead of using pins 12 and 13 the lever 10 may carry a lateral projection in the form of a fork through which the belt passes.

To maintain the mechanism in a position in which the electrical circuit cannot be accidentally completed or broken, it is proposed to provide a hollow locking pin 14 (see FIGURE 2) which may be supported on a cover plate 15, when in inoperative position, the latter being formed with a hole or opening large enough for the pin to pass therethrough and for access to a fixed locating pin 16, a hole 17 being formed in the operating lever 10 of a sufficient diameter to receive the pin 14 which lies co-axial with the pin 16 when the lever 10 is in the position shown in FIGURE 1.

To lock the lever 10 the locking pin 14 is inserted through the hole in the cover plate, through the hole 17 in the lever and over the pin 16. The locking pin may be anchored to a part such as for example the lever 10 by a screw 18 by a short length of chain.

To avoid corrosion of the relatively rotating parts, it is proposed that the pulleys shall be mounted on stainless steel spindles and shall include a bearing of the dry type, i.e. one which does not need lubrication during use.

The float and counterbalance weight are each secured to the belt by a single securing screw 19, 20 and consequently their positions can quickly and easily be reversed if required.

It will be appreciated that the positioning of the pulleys, switch and other parts enables the device to be mounted in a position where there is little head-room, the operating belt and stops passing over the pulleys freely, the mechanism having the further important advantage that it takes the form of a single self-contained unit, it being preferred to employ a switch of the flameproof type so that the unit can be safely installed in mines or other places where there is a possibility of inflammable gases being present.

Such an assembly as has been described has many uses where it is desired to operate an electric switch as a result of a predetermined change in the level of a liquid. Such an assembly can for example be used to bring a pump into and out of operation automatically or to actuate an audible or other warning or alarm, on the liquid reaching a dangerously high or low level.

We claim:

1. A float controlled switch assembly comprising a mounting plate, a pair of horizontally spaced pulleys lying in substantially the same plane and revolvably mounted about parallel axes extending from said mounting plate, an electric switch carried by said mounting plate and including an operating lever depending downwardly between said pulleys, a flat belt of non conductive and non corrosive material passing over both pulleys with the ends of said belt depending downwardly without lateral restraint, a float carried by one end of said belt, a counterweight carried by the opposite end of said belt, a projection on the outer surface of said flat belt situated at a point intermediate its ends, and a stop member on said operating lever of said switch engageable by said projection as a result of linear movement of said flat belt to move said operating lever to actuate said switch.

2. A float controlled switch assembly comprising a mounting plate, a pair of horizontally spaced pulleys lying in substantially the same plane and revolvably mounted about parallel axes extending from said mounting plate, an electric switch carried by said mounting plate and including an operating lever depending downwardly between said pulleys, a flat belt of non conductive and non corrosive material passing over both pulleys with the ends of said belt depending downwardly without lateral restraint, a float carried by one end of said belt, a counterweight carried by the opposite end of said belt, two projections in the form of transverse bars on the outer surface of said flat belt and situated at spaced points throughout the length of said belt, and a stop member on said operating lever of said switch engageable by either of said bars as a result of linear movement of said belt to move said operating lever in the appropriate direction to actuate said switch.

3. A float controlled switch assembly as claimed in claim 2, wherein the stop member is bifurcated to guide the passage of said belt therethrough but prevent the passage of the projections on the belt.

4. A float controlled switch assembly as claimed in claim 2, wherein the stop member on said switch operating lever comprises two spaced parallel horizontal pins through which the belt passes, the pins being sufficiently close together to prevent the passage of either bar therebetween.

5. A float controlled switch assembly as described in claim 2 wherein is additionally provided means for locking the switch operating lever against accidental movement.

6. A float controlled switch assembly as described in claim 5 wherein said means for locking the switch operating lever comprises a locking pin, an aperture in said lever and a fixed pin on said mounting plate, said locking pin being insertable through the lever aperture to engage the fixed pin.

References Cited in the file of this patent

UNITED STATES PATENTS

| | | |
|---|---|---|
| 1,133,013 | Eberhart | Mar. 23, 1915 |
| 1,411,698 | Hepler | Apr. 4, 1922 |
| 2,218,500 | Garstka et al. | Oct. 22, 1940 |
| 2,780,686 | Elliott | Feb. 5, 1957 |